Patented July 30, 1929.

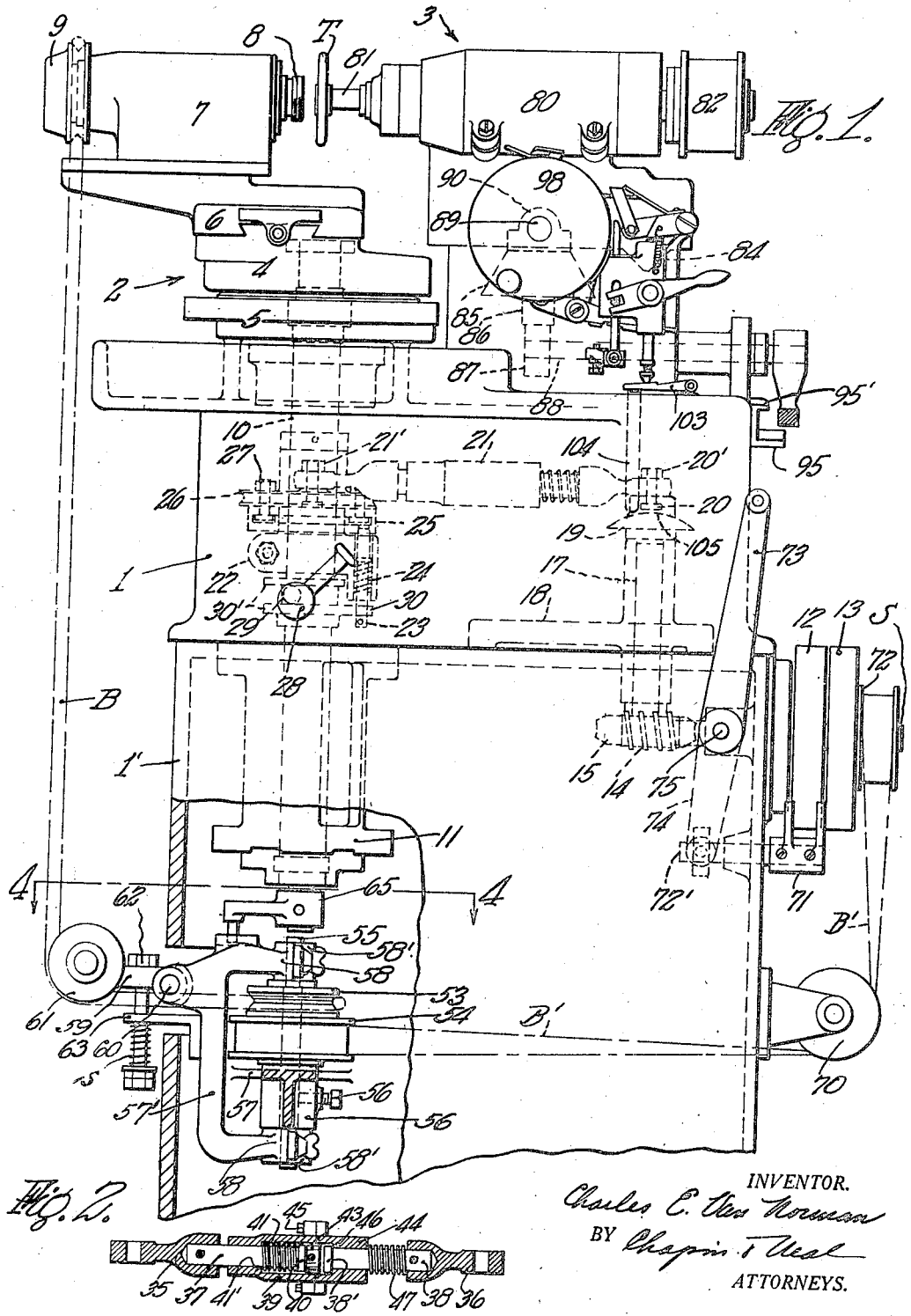

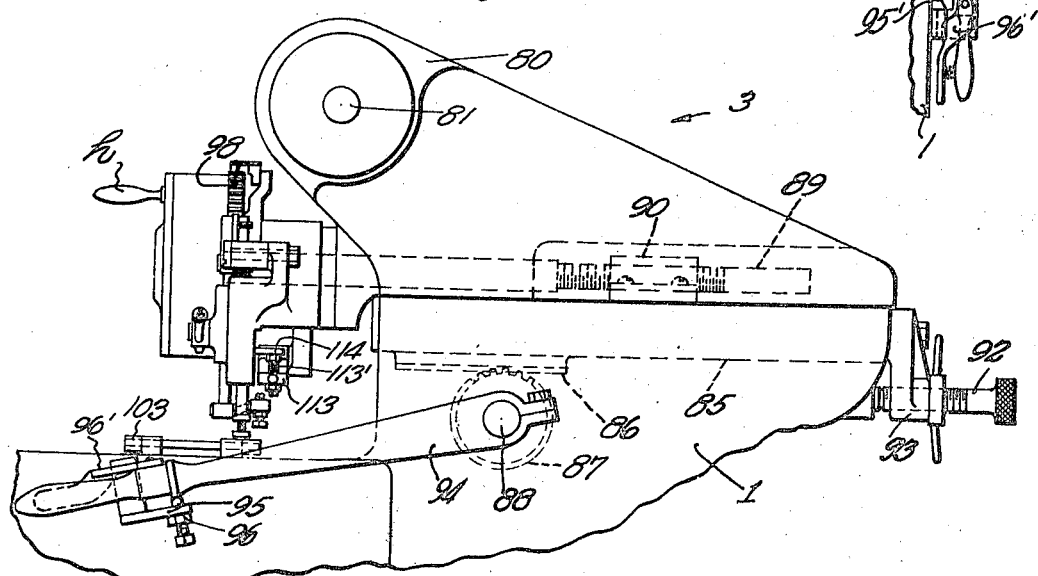

1,722,691

UNITED STATES PATENT OFFICE.

CHARLES E. VAN NORMAN, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS.

GRINDING MACHINE.

Application filed April 29, 1926. Serial No. 105,458.

This invention relates to improvements in grinding machines and is directed more particularly to machines having an oscillatable work carrying head or member and a tool carrying member for moving a rotating tool towards and away therefrom.

In machines of this class, directed as they are to the production of work with a high degree of precision, it is of great importance to prevent any vibrating or strain affecting even momentarily the relation of the work to the grinding element. To this end my invention in one aspect comprises an improvement in the manner in which rotative power is supplied to the work carrying head. In another aspect it comprises an improvement in the manner of oscillating the work carrying head relative to the grinding element. In other aspects, which form the subject-matter of divisional applications, it comprises an improvement in the manner of mounting and moving the grinding element for both a rough positioning and an accurate feeding movement towards or away from the work, whereby the grinding element is rendered steadier in operation and uniform in position.

Other objects and advantages will be obvious from the following description of the invention which is applicable to machines of various types although for descriptive purposes the form of the invention in its present preferred form will be described in connection with a machine suitable for grinding such work as a ball bearing race or the like.

In the drawings:

Fig. 1 is a side elevational view of a machine embodying the features of the invention;

Fig. 2 is a sectional view showing the novel characteristics of the connecting rod for connecting the oscillating head with the driving means therefor;

Fig. 3 is a side elevational view of the tool head and feeding means therefor;

Fig. 3ª is a fragmentary plan view showing the means for locking the slide operating lever;

Fig. 4 is a sectional plan view taken on the line 4—4 of Fig. 1; and

Figs. 5 and 6 are elevational views of the feed screw actuating mechanism in different positions.

Generally, the machine comprises a sub bed 1' supporting an upper bed 1 which in turn supports a work carrying head 2 arranged for oscillation on a vertical axis and a tool head 3 arranged for automatic feeding steps so as to feed or carry a rotating tool into operable engagement with the work as it is being oscillated by the work head.

The novel features of the invention will be more fully pointed out in connection with the following detail description thereof.

The oscillatable head comprises a base 4 arranged for a rotary or oscillating motion on a support 5 of the bed and may have a slide 6 reciprocable and adjustable therein in the usual manner which carries a bearing housing 7 for rotatably supporting a shaft 8 which is rotated by means of a driving belt B in engagement with a pulley 9 at the outer end thereof. A vertically disposed oscillatable shaft 10, fixed to the base 4 to serve as a pivot therefor, is suitably guided in the bed and in a downwardly depending bracket 11 secured to said bed. The shaft 8 may be screw threaded on its inner end or otherwise formed to receive a chuck, jig or other device for holding work to be machined and the slide 6 may be adjusted back and forth along the base 4 in any of the well known ways so that the work may be moved transversely toward and away from the axis of the shaft 10 into various positions of adjustment as may be required or desired.

The shaft 10 and work head fixed thereto are oscillated by means of the following. A driving shaft S at the right in Fig. 1 is rotatable in the bed and provided with tight and loose pulleys 12 and 13 and a driving pulley 72 on its outer end. A worm 14, carried by this shaft S at its inner end, is in engagement with a suitable gear 15 fixed to a vertically disposed rotatable shaft 17 which is carried by a bearing 18 fixed to the bed 1.

A member 19 having a cam face 105 on its upper side is fixed on the upper end of the shaft 17 and is provided with a slot 20 disposed transversely to its axis of rotation so that one end of a connecting rod 21 of novel form, and later to be described, may be pivotally secured thereto at various distances from its axis of rotation by a T bolt 20' of usual form.

A clamping collar 22 is fixed on the oscillatable shaft 10 and has a pin 23 slidable therein that is spring pressed upwardly by means of a spring 24 so that its upper end will enter an aperture of a disc 25 when the aperture and pin are in alignment. The disc 25 and another similar disc 26 thereabove are free to rotate on the shaft 10 except when disc 25 is fixed to the clamping collar 22 by pin 23 as above described, and the two discs are provided with bolts 27 working in slots thereof for securing the discs together in various angular relations or positions of adjustment. A T bolt 21', working in a slot of the disc 26 connects the connecting rod 21 thereto at various distances from the axis of oscillation of said discs. The mechanism just described is clearly shown and described in U. S. Reissue Patent 13,892 of March 16, 1915.

By means of the mechanism just described, it is possible while the pin 23 is in operable engagement with the disc 25 to oscillate the shaft 10 and consequently the work head through various angles or arcs of a circle and to locate the angle or arc of oscillation at various angular positions about the axis of oscillation as in the patent referred to.

When it is desired to stop the work head from oscillating without disconnecting the power from the shaft 17, as when finished work is being replaced with unfinished work, the members 22 and 25 are disconnected by withdrawing the pin 23 from the plate 25 and is accomplished by the means shown in my patent before mentioned.

It will be appreciated that ordinarily there will be a considerable shock to the mechanism in general and to the pivotal connections of the link in particular at the end of each oscillation of the head or at the time of reversal of movement. To overcome this and to cushion the shock at the reversing instant, I provide a connecting rod 21 of novel construction now to be described with particular reference to Fig. 2.

It comprises rod ends 35 and 36 fixed to relatively movable rods 37 and 38 respectively. The rod 37 is slidable in a member 39 and is provided on its forward end with a head 40 while a compression spring 41 encircling the rod 37 is interposed between said head and a suitable shoulder 41' of the member 39, which spring is arranged to urge the head of the rod forwardly against a plug 43 fixed within the end of the member 39. The rod 38 is slidable in a member 44 secured to the member 39 by the bolts 45 and is limited in its outward movement by a head 38' thereof which abuts a shoulder 46 of said member 44. A compression spring 47 encircling the rod 38 and interposed between the members 44 and 36 exerts pressure therebetween and tends to force them apart and to maintain the head 38' of the rod 38 against the shoulder 46.

When the connecting rod is pivotally connected to the driving and driven members 19 and 26, there is a tendency at each end of the oscillatory stroke to either compress or stretch the rod due to the reversal of direction of movement of the parts, but by means of my novel structure either the spring 41 or 47 may be compressed, accordingly as there is a tendency to lengthen or shorten the rod so that a cushioning action is effected to absorb the shock. Of course, the characteristics of the springs may be varied within wide limits to accommodate various conditions, but I have found that by the employment of this novel structure that the shocks are eliminated to such an extent that it is possible to increase the speed of oscillations and thereby increase the output of the machine.

The work spindle 8 of the work head is driven by means of the following. A shaft 55 separate from and below the shaft 10, but in axial alignment therewith, is fixed in a hub or boss 56 by means of a set screw 56', the said boss being suitably supported by webs or ribs 57 which extend from the said boss to the side walls of the sub bed 1'. An oscillatable member 57' has upper and lower bearing portions 58 and removable caps 58' which are adapted and arranged to embrace the upper and lower ends of the spindle 55 in such a manner that the member 57' may oscillate freely thereon. Pulleys 53 and 54 that are preferably integral are rotatable on the shaft 55, the former being belted to the pulley 9 of the spindle 8 by the belt B, while the latter is belted to a driving pulley 72 by a belt B' passing over the guide pulleys 70.

In order to maintain the belt B in a proper driving condition as the head 2 is oscillated, means are provided which comprise idler pulleys or guide sheaves 61 rotatable on an arm 59 pivoted at 60 for a vertical raising or lowering movement on the member 57'. A bolt 62 extending through said arm and a bracket 63 of the member 57' is acted upon by a spring s to exert a downward pull on said guide sheaves to thereby tension the belt.

It will be noted that the pulleys 53 and 54, while in axial alignment with the pivot of the oscillating work head, are journaled in the machine frame independently of the pivot shaft 10. Also the idle pulleys 61, which direct the belt B in it quarter turn, are carried on a support 57 pivoted coaxially with shaft 10 but independently of it. In the operation of a grinding machine in producing work with a high degree of precision all vibrations must be kept from affecting the relative positions of the work and the grinding element. It has been found that vibrations due to side slap or other irregular movement of the pulleys can be transmitted to the spindle of the work head through the oscillating shaft 10. The independent mounting of the driving pulleys prevents the direct transmission of these vibrations, and the flexibility of the driving belt prevents them from following it as a path. Also it will be noted that member 57' may be easily and quickly removed from the spindle or shaft 55 when it is necessary to work on or repair the belts.

In order to move the guide pulleys 61 in unison with the oscillatable work head and to thereby maintain the belt in proper driving relation during the oscillation of said work head, a crank 65 is provided that is fixed to the end of the oscillatable shaft 10 and has a downwardly depending pin or driver 65' which works in a suitable slot or groove of the member 57'. As the shaft 10 is oscillated, the member 57' is thereby moved or oscillated but the pin and slot connection just described is preferably arranged so that the contact is reduced to a minimum whereby vibrations, as before referred to, are not transmitted to the oscillatable shaft 10. Also, the pin and slot connection permit the easy removal of the member 57' from the shaft 55.

A belt shifter 71, carried on the end of a reciprocable shaft 72, is moved back and forth by means of a lever 74 fixed to a rotatable shaft which is operated by a hand lever 73 fixed to said shaft. By this shifting mechanism, a driving belt may be shifted between the tight and loose pulleys 12 and 13 whereby the pulley 72 may be driven from any suitable source of power such as a line shaft, motor or the like.

The tool head 3 includes a bearing 80 in which is rotatably mounted a shaft or quill 81 for carrying a tool T which may be in the form of an abrasive wheel or the like and a pulley 82 fixed to the opposite end of said shaft 81 is provided that may be belted to any suitable source of power independent or not of that for the pulley 72.

The tool head 3 is adapted for reciprocation back and forth along the bed and is guided therein by a V guide 84 of usual form. While I have shown the head 3 as being reciprocable relative to the bed in a certain direction, it will be obvious that it may be arranged for movement therealong at any angle desired as distinguished from that shown. A sub-slide 85 is disposed below the head 3 and is separately guided in the bed 1 for reciprocation back and forth therealong.

The head 3 and sub-slide 85 are relatively movable by means associated therewith, said means being arranged so that one slide may be moved by the other for certain purposes. That is, a movement of the sub slide will move the tool slide or head towards or away from the work head while, when the subslide is held from movement on the bed, the tool slide may be moved relative thereto so that the tool is moved with respect to the work at a predetermined rate of feed. Also, other means are provided for automatically changing the rate of feed and for discontinuing the feeding movement at a predetermined time, all of which mechanism will now be described with particular reference to Figs. 3, 3ª, 5 and 6.

A feed screw 89, rotatable in the head 3 but held from longitudinal movement therein in the usual manner, is in threaded engagement with a nut 90 fixed to the upper side of the sub slide 85. It will be observed that if the feed screw 89 is rotated the sub slide 85 and head 3 will be moved relative to one another. Therefore, in order to move the head in a particular direction by a rotation of the feed screw, it is necessary to prevent a relative movement of the sub slide and bed. This is accomplished by providing a stop screw 92 arranged for adjustment in a member 93 secured to the outer end of the sub slide, which screw 92 is adapted to abut the bed as shown in Fig. 3, and when in abutment a counterclockwise rotation of the feed screw will move the head 3 relative to said subslide and towards the work head.

A shaft 88, rotatable in the bed 1 below the slides, carries a pinion 87 in meshing engagement with a rack 86 fixed to the lower side of the sub slide and carries a lever 94 on its outer end by the means of which the slide 85 and tool slide 3 are moved forward or back.

That is, a clockwise movement of the lever 94 will move the tool head or slide and sub slide rearwardly when it is desired to move the tool away from the work. A counterclockwise movement of said lever will move the slides towards the work until their movement is arrested by the screw 92 abutting the bed 1. When moved to this abutting position, the mechanism presently to be described will operate the feed screw to feed the tool slide relative to the sub slide and to thereby feed the tool towards or against the work. By this lever 94 and associated mechanism, it will be observed that the slides may be moved without disturbing the feeding mechanism associated therewith.

In order to eliminate a strain of the parts should the lever be forced downwardly and also to lock the lever to hold the screw 92 in abutment with the bed and to thereby hold the sub slide in a fixed position, I provide the following. A plate 95 secured to the side of the bed has a screw 96 adjustable therein for abutting the under side of the lever 94 which may be set so that the lever brings up against the screw 96 just as the screw 92 abuts the bed 1. An upstanding lug of the member 95 has inwardly extending lip 95' while a latch member 96' pivoted to the handle of the lever 94 is spring pressed outwardly and is arranged to catch beneath the lip as the lever is swung downwardly into abutment with the screw 96. By squeezing the latch against the lever handle, the latch is drawn from beneath the lip so that the lever may be swung upwardly.

In order to rotate the feed screw to automatically feed the tool head 3 forwardly after the sub slide has been arrested in its forward movement, I provide the novel mechanism, best shown in Figs. 3, 5 and 6. A ratchet wheel 98 fixed to the feed screw 89 is arranged to be urged counterclockwise by a pawl 99 pivotally carried on a rocking lever 100. The lever 100 is actuated by a feed rod 101 reciprocable in a bearing 102 carried by the head 3 and which rests upon and is slidable along an impulse member or tilting plate 103 of usual form pivoted on the bed 1. The plate 103 is raised by a plunger rod 104 reciprocable in the bed 1 and which has its lower end in the path of the cam surface 105 of the rotating member 19. This mechanism is similar in operation to that of the mechanism shown and described in my U. S. Reissue Letters Patent No. 13,892 of March 16, 1915.

The pawl 99 is urged forwardly between the teeth of the ratchet 98 by a spring 99' and in each raising movement of the lever 100 effected by the rod 101 the ratchet wheel 98 will thereby be urged counterclockwise to rotate the feed screw and consequently move the head forwardly with respect to the sub slide 85 and bed 1. It is desirable to insure a positive lowering movement of the lever 100 which is accomplished by means of a spring 100' connected to said lever and bearing 102. In lowering, the ratchet pawl 99 rides over a member of the teeth of the ratchet 98 so as to be in readiness for a subsequent feeding movement. The arrangement of the parts may be such that the ratchet wheel may be rotated through any angle desired to thereby feed the tool forwardly a required amount or distance. However, according to my invention, the mechanism just described will preferably be arranged to first feed the head forwardly in steps that may be termed "rough cutting" steps as compared with or as distinguished from subsequent "finish cutting" steps, the mechanism for which will now be described with particular reference to Figs. 5 and 6.

A member 110 rotatably and frictionally embracing the hub of the ratchet 98 is adapted to be angularly adjusted with respect thereto and will be carried thereby in its rotation and has a cam 111 adjustable thereon as shown in Fig. 6. A lever 112 pivotally mounted at 112' for a swinging movement is formed to carry a roll or other contacting element at its end in the path of the cam 111 while its opposite or outer end carries a lifter blade 113. A screw 113' adjustable in the blade 113 is arranged (see Fig. 3) when the lever is raised to strike against the underside of a pin 114 fixed to the rod 101 and extending rearwardly therefrom and working in a slot of the member 102. As the lever 112 is moved by the cam 111 towards the position shown in Fig. 6, the rod 101 is raised from the plate 103 so that the plate in its raising movement will not engage the rod 101 until the latter end of its raising movement, so that in each raising movement of the plate 103 the rod 101 is elevated thereby a less distance than formerly and consequently the ratchet wheel is moved through a less angle to feed the head forwardly in the so-called "finish cutting" steps. To stop the operation of the feed screw after any desired number of finish cutting steps, I provide means for disconnecting the pawl from the ratchet wheel.

A trip out plate 115 formed to overlie the teeth of the ratchet 98 is carried by a portion 115' of member 110 and is adapted to be rotated by the member 110 so as to enter between and prevent the pawl acting on the ratchet wheel and thereby prevent an actuation of the feed mechanism at the completion of a certain number of finish cutting steps.

It will be appreciated that if it is desired to rotate the wheel 98 and feed screw by means of the handle $h$ that the cam 111 will in each rotation actuate the lever 112 and the teeth of the ratchet wheel will click by the pawl 99. In order to hold the pawl away from the teeth of the wheel and to hold the lever 112 from the path of the cam to thereby allow a free rotative movement of the wheel, I provide the following:

A lever 116 pivoted at 117 to the member 102 has a bifurcated end for straddling a pin 118 fixed to a rod 119 slidable in the member 102. An arm 120 adjustably fixed on the lower end of the rod 119 has an abutment screw 120' arranged to abut the lower side of lever 112, while the upper end of the rod 119 is arranged to abut the lower side of the pawl 99. As the lever 116 is depressed the rod 119 is moved upwardly to move the pawl away from the teeth of the wheel, one end of the lever 112 is moved out of the path of cam 111, while its other end moves the rod 101 up and out of contact with the plate 103. When in this position, the wheel 98 may be rotated freely as may be desired. Any means such as a spring 122 interposed between the lever 116 and the member 102 may be employed for holding the lever in its raised or other positions.

Due to the gradual wear on the grinding wheel, it is necessary periodically to rotate the trip plate 115 clockwise relatively to the ratchet wheel, so that the grinding wheel will be advanced sufficiently to take up the wear. I have shown in Fig. 6 mechanism for producing this relative movement when desired.

An arm 110' extending from and fixed to the member 110 has pivoted thereto a lever L having a pawl shaped spring 116' on its upper side overlying the teeth on the periphery of the ratchet wheel 98. A spring 117' connecting the lever 115' and the arm 110' tends to hold the pawl away from the teeth of the ratchet. In operation, the lever 115' is depressed so that the pawl engages with a tooth of the wheel. Since the member 110 is only frictionally held by the ratchet wheel, the pressure applied to the lever will act upon its pivotal connection with the arm 110' with a toggle action due to the flexing of the spring pawl 116' and will move said connection clockwise and as a consequence move the trip plate also clockwise relative to the ratchet wheel. This operation may be repeated as may be desired so that any number of feeding steps of of the wheel may be employed before the plate again throws out the pawl 99. The adjustment thus made is permanent, and will not have to be repeated except as further wear of the grinding wheel makes it necessary.

As will be seen, the member 110 which carries the trip out 115 and cam 111 may be adjusted angularly with respect to the ratchet wheel and the feed screw and also the cam may be adjusted relatively to the trip out. By the mechanism described, it is possible to set the member 110 with reference to the ratchet wheel so that the cam 111 will position the lever 112 and rod 101 for "finish cutting" steps after any desired number of previous "rough cutting" steps. And since the trip out and cam are relatively adjustable, the mechanism may be adjusted so that the trip will operate to throw out the feed actuating mechanism entirely subsequent to any desired number of "finish cutting" steps. That is, the parts may be adjusted to actuate the ratchet wheel in any number of "rough cutting" steps, then in any number of "finish cutting" steps and finally to discontinue the feeding action entirely.

In operation, the lever 94 will be rotated to carry the tool head 3 and sub slide to the rear to move the tool away from the work head so that a piece of work may be secured to the rotatable spindle of the work head. The oscillating mechanism is adjusted for oscillating the work head through the desired angle or arc of a circle and power is applied to the pulleys 72 and 13 for driving the various parts. During the oscillations of the work head 2, it will in turn oscillate the bracket 57' and thereby maintain the belt B in proper driving relation with the spindle 8 of the work head.

With the work secured in the head, the lever 94 is rotated counterclockwise to move the head and sub-slide forwardly until the screw 92 of the sub slide abuts the bed. This screw is preferably so adjusted that the movement of the lever will carry the rotating tool up to the work for commencement of the "rough cutting" operating and the adjusting screw 95 and lever 94 are arranged with respect to the shaft 88 so that the lever brings up against the screw 95 just as the stop 92 brings up against the bed to thereby eliminate any springing of the parts, while at the same time the lever is locked in this position by the latch mechanism associated therewith.

As the member 19 rotates its cam surface or surfaces will raise the rod 104 to actuate the rod 101 and pawl 99. This action will rotate the ratchet wheel and screw counterclockwise to feed the head forwardly with respect to the sub slide and bed and thereby feed the tool towards the rotating and oscillating work in "rough cutting" steps. The member 110 may be adjusted in any angular relation with respect to the ratchet 98 so that the rough cutting steps will be replaced by "finish cutting" steps when desired, in which case the cam 111 engages with the lever 112 to raise the rod 101 upwardly from the plate so that the rod 101 is engaged only during the latter part of the raising movement of the plate 103 which will in each movement move the rod a less distance and cause the ratchet wheel to be moved through a less angle. At the completion of the cutting or machining operation, the trip plate 115 will enter between the pawl 99 and wheel 98 so that the pawl is held from engagement with the teeth of the ratchet and thereby will arrest all feeding movements of the ratchet.

Should it be desired to move the rod 101 upwardly so that it will be acted upon for finish cutting steps only, or should it be necessary or desirable to rotate the ratchet wheel by means of the handle h, the lever 116 may be moved downwardly to locate the parts in proper relation for accomplishing this.

To remove finished work from the head, the shaft 28 is rotated counterclockwise to disengage the oscillating driving means from the oscillatable work head and the lever 94 is actuated counterclockwise to move the tool head away from the work.

From the foregoing it will be observed that I have provided an apparatus in which independent means are employed for oscillating the work head and for driving the rotating spindle thereof. Also it will be noted that I have provided means for automatically feeding the tool towards the work at variable predetermined speeds which is arranged to automatically change the speeds during the feeding movement and to automatically disconnect the feeding mechanism at a predetermined time.

Having described the invention in the form at present preferred, I prefer to be limited by the appended claims rather than by the foregoing description.

What I claim is:

1. In a machine of the class described, a heavy base, a work head pivoted for oscillation about an axis in the base, a work holder rotatably mounted in the work head, a belt pulley fixed to the work holder for rotation therewith, a belt pulley axially in line with the pivot axis of the work head but independently mounted in the base frame, a belt connecting the two pulleys, means for oscillating the work head, and means for rotating the second named belt pulley.

2. In a machine of the class described, a heavy base, a work head pivoted for oscillation about an axis in the base, a work holder rotatably mounted in the head upon an axis radial to the axis of oscillation of the head, a belt pulley fixed to the work holder for rotation therewith, a belt pulley axially in line with the pivot axis of the work head but independently mounted in the base, a member oscillatable about the axis of the second named belt pulley, guide pulleys journaled on the member with their axes at right angles to the axes of the two other pulleys, a belt running over all of the pulleys, means for rotating the second named belt pulley, and means for oscillating the work head and the member in synchronism.

3. In a machine of the class described, a heavy base, a work head, a vertical pivot carrying the work head and journaled for oscillation in the base, a work holder rotatably mounted in the head upon a horizontal axis radial to the axis of oscillation of the head, a belt pulley fixed to the work holder for rotation therewith, a vertical shaft fixed in the base axially in line with but disconnected from the vertical pivot, a belt pulley rotatable on the shaft, a member oscillatable about the shaft, guide pulleys journaled on the member with their axes horizontal and at right angles to the axes of the two other pulleys, a belt running around the pulleys mounted on the work holder and the shaft and making a quarter turn around the guide pulleys, means for rotating that pulley mounted on the vertical shaft, means for oscillating the vertical work head pivot, and a crank and slot connection between the work head pivot and the member for causing them to oscillate in unison.

4. In a machine of the class described, a heavy base, a work head pivoted for oscillation about an axis in the base, a work holder rotatably mounted in the work head, a belt pulley fixed to the work holder for rotation therewith, a belt guiding pulley oscillatable about an axis in line with the pivot axis of the work head but mounted in the base independently of the work head, a belt passing around the two pulleys, means for oscillating the work head and the belt guiding pulley in synchronism, and means carried by the base independently of the means for oscillating the work head and operable independently of the angular position of the work head for transmitting motion to the belt.

5. In a machine of the class described, a heavy base, a work head pivoted for oscillation in a bearing in the base, a work holder rotatably mounted in the work head, a belt pulley fixed to the work holder for rotation therewith, guide pulleys journaled for oscillation in the base upon a bearing independent of the bearing for the oscillatable work head, a driving pulley rotatably mounted in bearings in the base independent of the bearing for the oscillatable work head and substantially aligned with the axis of oscillation of the guide pulleys, a belt passing over all the pulleys, means for rotating the driving pulley, and means for oscillating the work head and the guiding pulleys in synchronism.

In testimony whereof I have affixed my signature.

CHARLES E. VAN NORMAN.